United States Patent
Satou

(10) Patent No.: US 11,331,817 B2
(45) Date of Patent: May 17, 2022

(54) MAINTENANCE APPARATUS OF ROBOT AND MAINTENANCE METHOD OF ROBOT

(71) Applicant: FANUC CORPORATION, Yamanashi (JP)

(72) Inventor: Shunsuke Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 259 days.

(21) Appl. No.: 16/795,976

(22) Filed: Feb. 20, 2020

(65) Prior Publication Data
US 2020/0338759 A1     Oct. 29, 2020

(30) Foreign Application Priority Data
Apr. 24, 2019   (JP) .............................. JP2019-082855

(51) Int. Cl.
| B25J 17/00 | (2006.01) |
| B25J 17/02 | (2006.01) |
| B25J 18/00 | (2006.01) |
| B25J 19/00 | (2006.01) |
| B25J 5/02  | (2006.01) |
| B66F 3/24  | (2006.01) |

(52) U.S. Cl.
CPC ............ B25J 19/0066 (2013.01); B25J 5/02 (2013.01); B66F 3/24 (2013.01)

(58) Field of Classification Search
CPC ................................ B02J 19/0066; B25J 5/02
See application file for complete search history.

(56) References Cited

U.S. PATENT DOCUMENTS

| 4,451,979 A | 6/1984 | Schuster |
| 5,460,452 A | 10/1995 | Hara |
| 6,234,737 B1* | 5/2001 | Young ..................... B25J 5/02 |
| | | 414/277 |
| 9,968,974 B2* | 5/2018 | Stockert .................. B25J 21/00 |
| 2015/0246380 A1 | 9/2015 | Stockert et al. |

FOREIGN PATENT DOCUMENTS

| JP | H03-230097 A | 10/1991 |
| JP | H05-051115 A | 3/1993 |
| JP | H05116091 A | 5/1993 |
| JP | H06-079659 U | 3/1994 |
| JP | H06-065617 U | 9/1994 |
| JP | H07-053189 A | 2/1995 |
| JP | H07-071001 A | 3/1995 |

(Continued)

OTHER PUBLICATIONS

Japanese Office Action dated Jun. 22, 2021, in connection with corresponding JP Application No. 2019-082855 (11 pp., including machine-generated English translation).

(Continued)

*Primary Examiner* — Jake Cook
(74) *Attorney, Agent, or Firm* — Maier & Maier, PLLC

(57) ABSTRACT

A maintenance apparatus of a robot includes a pair of parallel rails removably installed on opposite sides in a predetermined direction to a robot, and a number of sliders, at least one of the number of sliders is attached to each of the pair of rails, and each of the sliders is configured to support an arm part or a reducer of the robot, and move the supported arm part or reducer along the rails.

8 Claims, 7 Drawing Sheets

(56) References Cited

FOREIGN PATENT DOCUMENTS

| | | | |
|---|---|---|---|
| JP | 2000-210834 | A | 8/2000 |
| JP | 2002-003179 | A | 1/2002 |
| JP | 2010255849 | A | 11/2010 |
| JP | 2016-205012 | A | 12/2016 |
| WO | 2015/131208 | A1 | 9/2015 |

OTHER PUBLICATIONS

Japanese Search Report dated Jun. 11, 2021, in connection with corresponding JP Application No. 2019-082855 (23 pp., including machine-generated English translation).

* cited by examiner

MAINTENANCE APPARATUS OF ROBOT AND MAINTENANCE METHOD OF ROBOT

CROSS-REFERENCE TO RELATED APPLICATIONS

This application claims the benefit of Japanese Patent Application No. 2019-082855, the content of which is incorporated herein by reference.

FILED

The present invention relates to a maintenance apparatus of a robot and a maintenance method of the robot.

BACKGROUND

Heretofore, there has been known a jack apparatus including a movable table movably provided on an X-direction rail extending in an X-direction, a Y-direction rail provided on the movable table to extend in a Y-direction, and a single jack movably supported on the Y-direction rail, for use in supporting a heavy load in a factory or the like. Such a jack apparatus is described in, for example, Japanese Unexamined Patent Application, Publication No. 2002-003179.

Furthermore, as an apparatus to replace a jig that is a heavy load for use together with an articulated type robot, known is an apparatus including a jig carrying device that passes through a space right under the articulated type robot and a lifting device disposed on a back surface side of the articulated type robot and capable of moving up the jig on the jig carrying device. Such an apparatus is disclosed in Japanese Unexamined Patent Application, Publication No. 2000-210834.

SUMMARY

A maintenance apparatus of a robot according to a first aspect of the present disclosure includes a pair of parallel rails removably installed on opposite sides in a predetermined direction to the robot, and a plurality of sliders, at least one of the plurality of sliders is attached to each of the pair of rails, and each of the sliders is configured to support an arm part or a reducer of the robot, and move the supported arm part or reducer along the rails.

A maintenance method of a robot according to a second aspect of the present disclosure includes a step of fixing a pair of parallel rails on opposite sides in a predetermined direction to the robot, and a step of supporting an arm part or a reducer of the robot by at least one of sliders that is attached to each of the pair of rails, and moving the supported arm part or reducer along the rails.

DETAILED DESCRIPTION OF EMBODIMENTS

A maintenance apparatus of a robot according to one embodiment will be described hereinafter with reference to the drawings.

Figure 1:
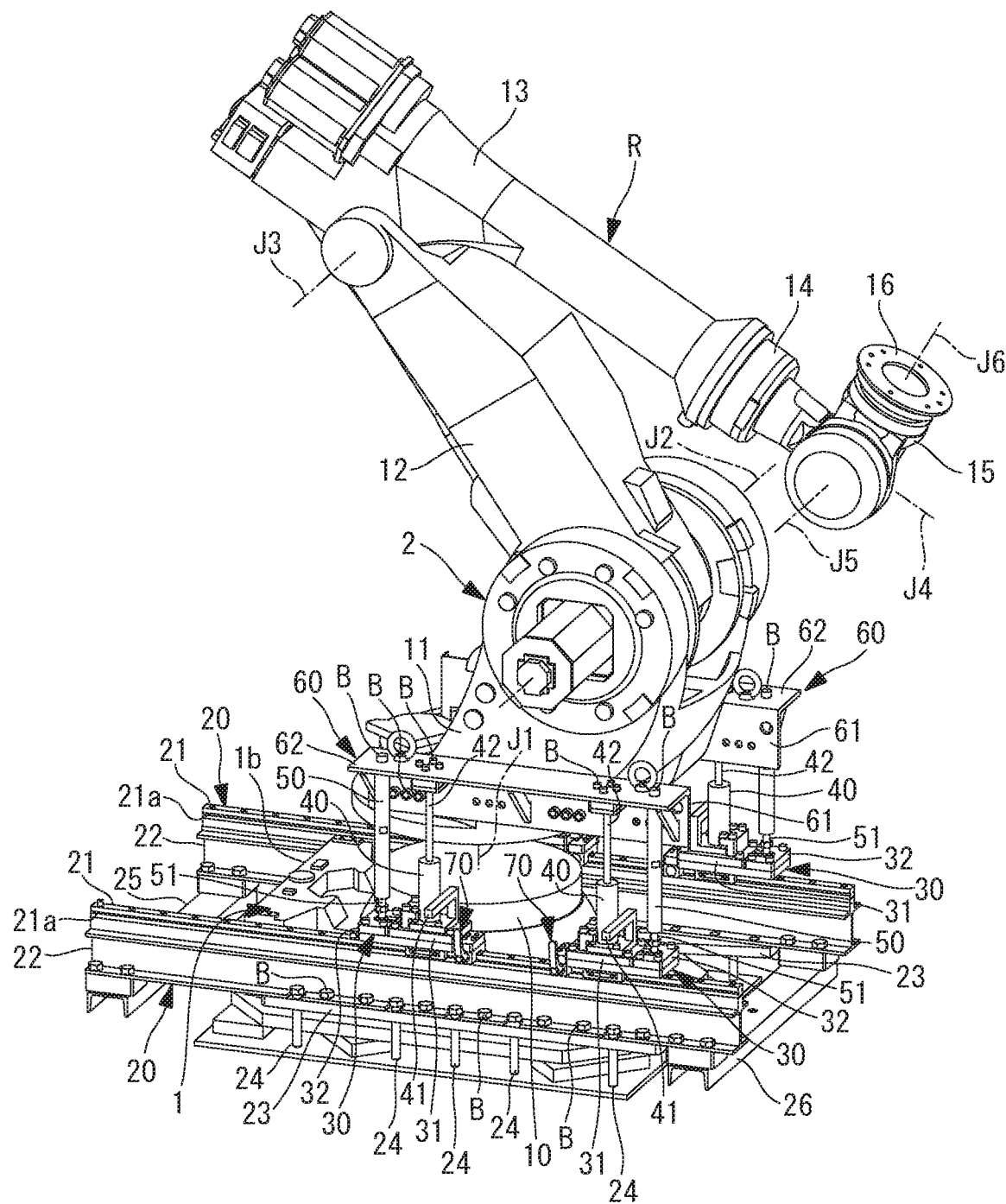
FIG. 1 is a perspective view of a maintenance apparatus of a robot of an embodiment.

As shown in FIG. 1, the maintenance apparatus of the robot of the present embodiment is for use in a vertical articulated type robot R. The maintenance apparatus of the present embodiment may also be used in another type of robot such as a horizontal articulated type robot.

As shown in FIG. 1, the robot R of the present embodiment includes a base part 1 and an arm part 2, and an arbitrary tool is attached to a tip of the arm part 2.

Figure 2:
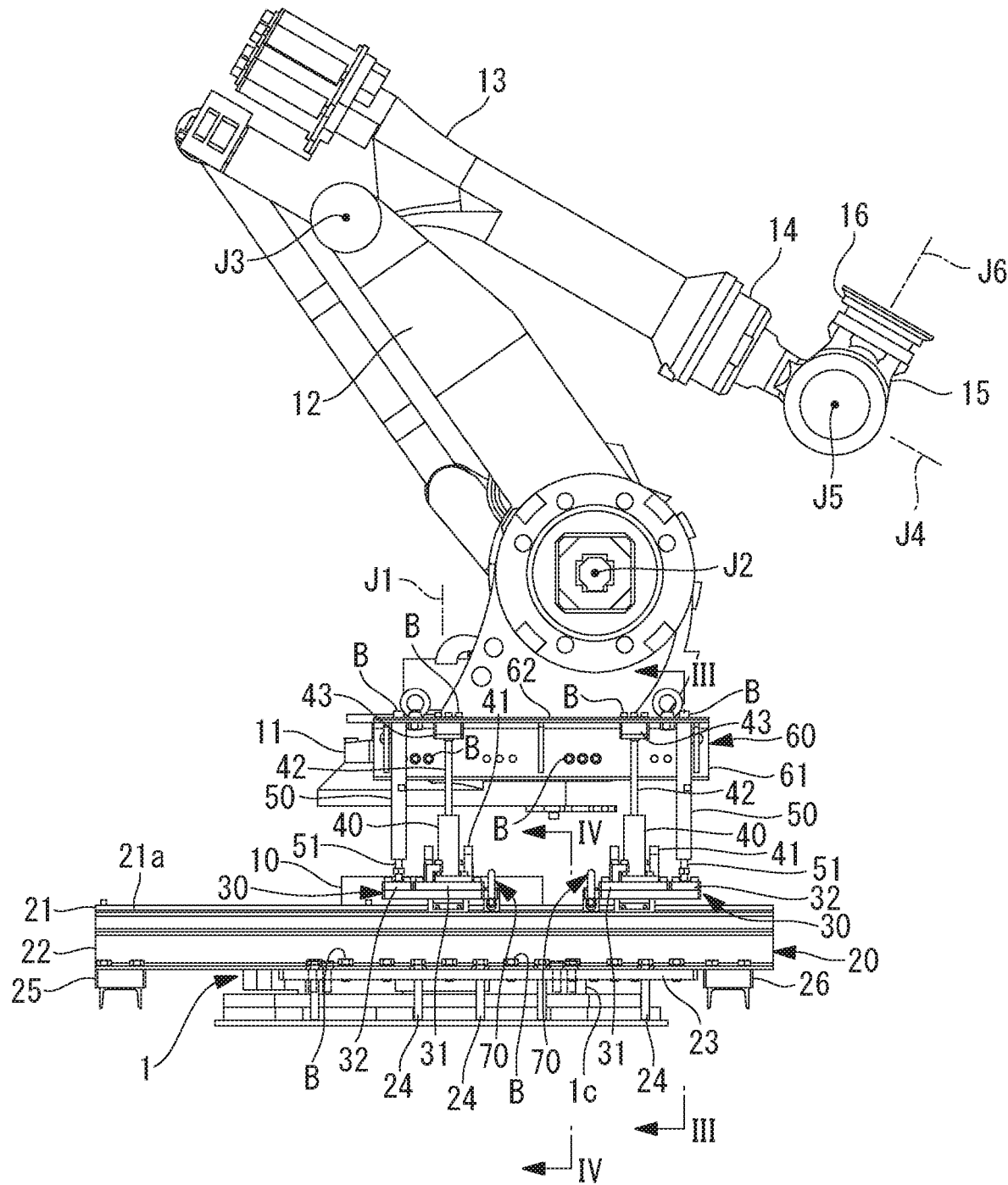
FIG. 2 is a side view of the maintenance apparatus of the present embodiment.

As shown in FIG. 1, FIG. 2 and others, the arm part 2 includes a first arm member 11 supported rotatably about a first axis J1 extending in an up-down direction in the base part 1 fixed to a predetermined installation surface. Note that in FIG. 1 and FIG. 2, the first arm member 11 is removed from the base part 1. The arm part 2 includes a second arm member 12 having a base end side supported swingably about a second axis J2 extending in a horizontal direction in the first arm member 11, and a third arm member 13 having a base end side supported swingably about a third axis J3 extending in the horizontal direction on a tip side of the second arm member 12.

Furthermore, the arm part 2 includes a fourth arm member supported by the third arm member 13 rotatably about a fourth axis J4 extending in a longitudinal direction of the third arm member 13, a fifth arm member 15 supported by the fourth arm member 14 swingably about a fifth axis J5 extending in a direction orthogonal to the fourth axis J4, and a sixth arm member 16 supported by the fifth arm member 15 rotatably about a sixth axis J6.

Additionally, the arm part 2 includes a plurality of servo motors that drive the first to sixth arm members 11 to 16, respectively. As each servo motor, any type of servo motor such as a rotary motor or a linear motor may be used. Note that the robot R of the present embodiment is a 6-axis articulated type robot, but may be any articulated type robot other than the six axes.

As shown in FIG. 1 and FIG. 2, the first arm member 11 is attached to a driving reducer 10 of the first arm member 11 with a plurality of bolts. In FIG. 1 and FIG. 2, the first arm member 11 has already been removed from the reducer 10. During use of the robot R, the first arm member 11 is fixed to an output shaft of the reducer 10 with a plurality of bolts, and the arm part 2 pivots about the first axis J1 depending on rotation of the output shaft of the reducer 10.

The maintenance apparatus of the present embodiment includes a pair of mutually parallel rails 20 removably fixed on opposite sides in a predetermined direction to the robot R, and two sliders 30 attached to each of the pair of rails 20.

In an example, the pair of rails 20 are removably attached on the opposite sides in a width direction to the robot R. As shown in FIG. 2, the base part 1 of the robot R of the present embodiment includes a rear end portion 1b including a connector to connect a cable for the robot R, and a front end portion 1c disposed on a side opposite to the rear end portion 1b in the base part 1. In the present embodiment, a horizontal direction in which the rear end portion 1b is opposite to the front end portion 1c is a front-back direction of the robot R, and a horizontal direction orthogonal to the front-back direction is the width direction of the robot R.

As shown in FIG. 1 and FIG. 2, each rail 20 includes a running unit 21 extending in the front-back direction of the robot R and along which a slider 30 runs, and a reinforcing frame 22 to which the running unit 21 is fixed.

As the running unit 21, a known linear guide rail is usable. In the present embodiment, the running unit 21 is made of metal, and running grooves 21a are formed on opposite sides of the running unit 21 in the width direction of the robot R.

Figure 3:
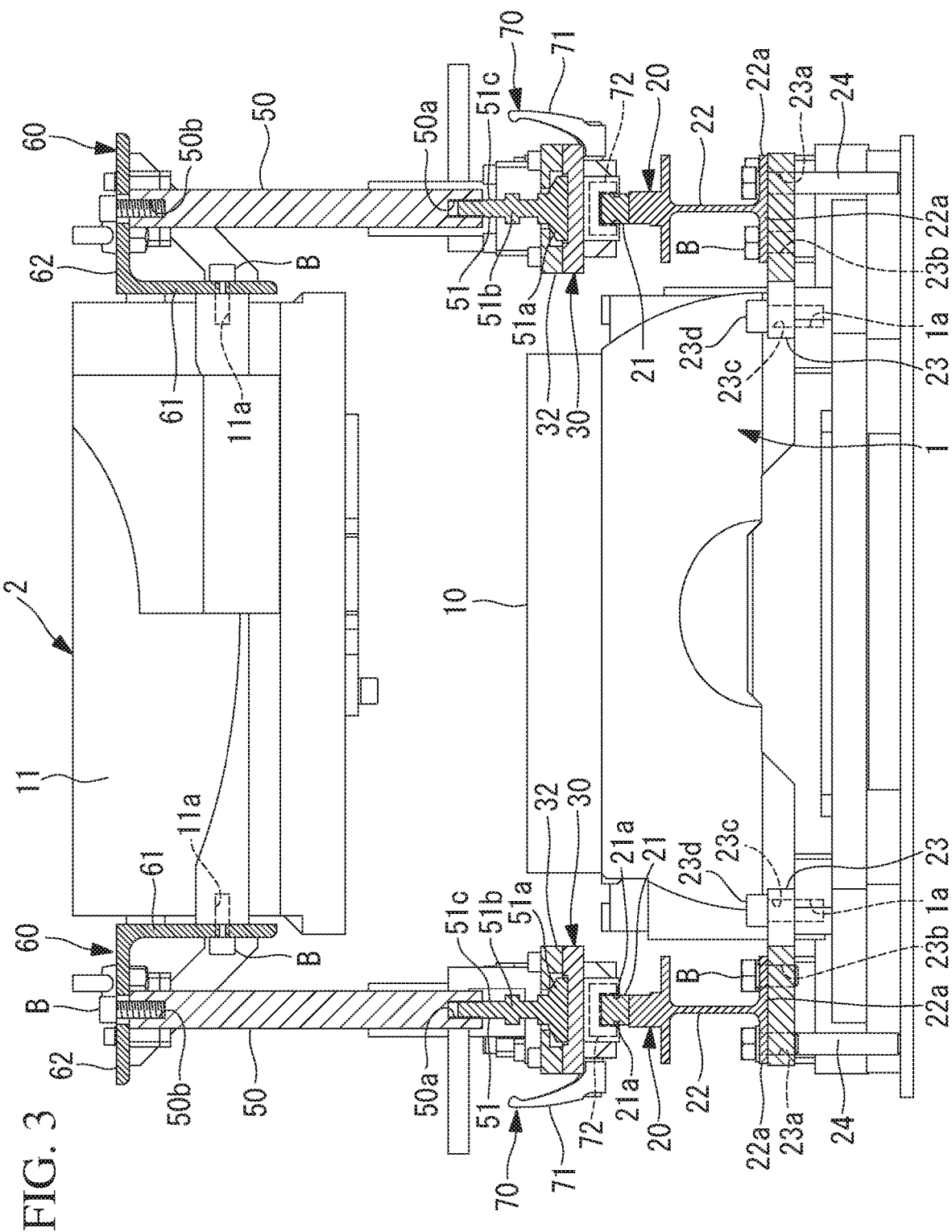
FIG. 3 is a cross-sectional view taken along the III-III line of FIG. 2.
Figure 4:
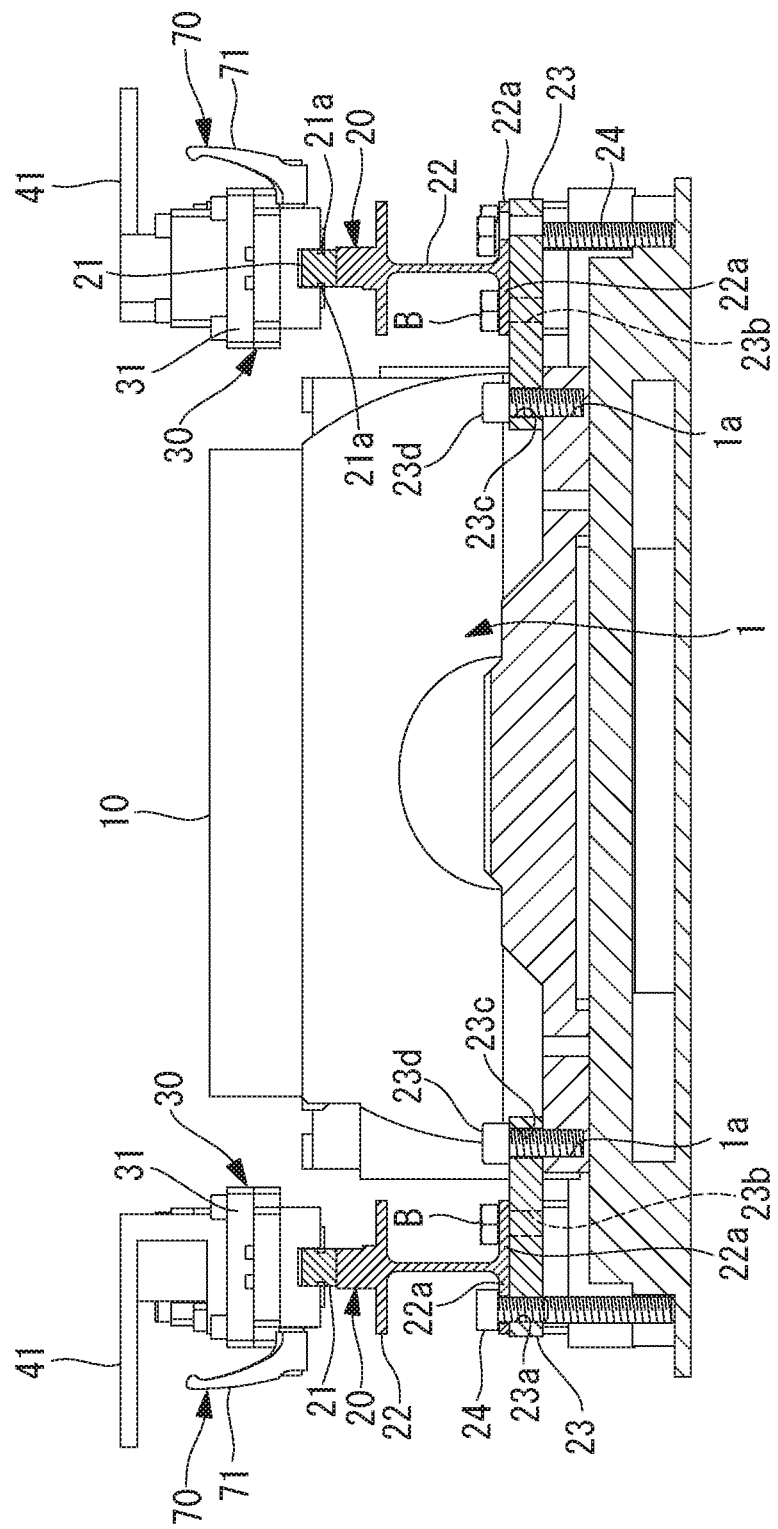
FIG. 4 is a cross-sectional view taken along the IV-IV line of FIG. 2.

The reinforcing frame 22 is made of metal such as iron. As shown in FIG. 3 and FIG. 4, a beam material having an almost H-shaped cross section is usable as the reinforcing frame 22, and such a beam material may be referred to as, for example, an H-section steel. The running unit 21 is fixed to an upper end face of the reinforcing frame 22 with a plurality of bolts or a plurality of rivets, or by welding or the like.

In a lower end portion of the reinforcing frame 22, formed are a pair of flanges 22a extending in the width direction on the opposite sides of the robot R.

As shown in FIG. 3 and FIG. 4, a pair of reinforcing frames 22 are attached to the base part 1 of the robot R via rail fixing members 23, respectively. In the present embodiment, each of the rail fixing members 23 is a plate member extending in the horizontal direction, and the rail fixing member 23 is longitudinal in the front-back direction of the robot R. The rail fixing member 23 is made of metal, and a plurality of female screw holes 23a are formed in an outer part of the rail fixing member 23 in the width direction of the robot R. The plurality of female screw holes 23a are arranged via a space in the front-back direction of the robot R, and each female screw hole 23a extends through the rail fixing member 23 in the up-down direction. It can be considered that the outer part of the rail fixing member 23 in the width direction of the robot R is a part disposed in the rail fixing member 23 on a side opposite to the base part 1.

A plurality of female screw holes 23b are also formed in an intermediate part of the rail fixing member 23 in the width direction of the robot R. The plurality of female screw holes 23b are arranged via a space in the front-back direction of the robot R, and each female screw hole 23b extends through the rail fixing member 23 in the up-down direction.

A plurality of through holes 23c are formed in an inner part of the rail fixing member 23 in the width direction of the robot R. The plurality of through holes 23c are arranged via a space in the front-back direction of the robot R, and each through hole 23c extends through the rail fixing member 23 in the up-down direction.

As shown in FIG. 3 and FIG. 4, fixing bolts 23d extend through the plurality of through holes 23c, respectively, in the up-down direction, and the respective fixing bolts 23d are fastened into screw holes 1a provided in the base part 1. Consequently, a pair of rail fixing members 23 are fixed on opposite sides of the base part 1 in the width direction.

The screw holes 1a are used to lift up the robot R with a fork lift, a chain block or the like during installation of the robot R or the like. At this time, an eye bolt, a pocket for the fork lift or the like is fixed to the base part 1 using each of the screw holes 1a. That is, the screw holes 1a are screw holes usually provided in the base part 1.

As shown in FIG. 1 to FIG. 4, a plurality of bolts B are inserted through the flanges 22a of each of the reinforcing frames 22 in the up-down direction, and the plurality of bolts B are screwed into the female screw holes 23a or the female screw holes 23b. Consequently, a lower end portion of the rail 20 is fixed to an upper surface of the rail fixing member 23. Note that through holes through which the bolts B are inserted, cutouts or the like are provided in the flanges 22a of the reinforcing frame 22.

Furthermore, as shown in FIG. 1, FIG. 2 and FIG. 4, adjustment bolts 24 that are adjustment members are screwed into some of the female screw holes 23a. When each adjustment bolt 24 is rotated in a predetermined direction, a lower end of each adjustment bolt 24 is in contact with the installation surface. The lower end of each adjustment bolt 24 may be in contact with an upper surface of a lower end portion of the base part 1.

The rail fixing members 23 may be fixed to the base part 1 after the rails 20 are fixed to the rail fixing members 23, or the rails 20 may be fixed to the rail fixing members 23 after the rail fixing members 23 are fixed to the base part 1.

The rails 20 are fixed to the base part 1 as described above, and then a tilt amount of the rails 20 is adjusted with each adjustment bolt 24. Specifically, in a state where each adjustment bolt 24 is in contact with the lower end portion of the base part 1 or the installation surface, each adjustment bolt 24 is suitably fastened, to adjust the tilt amount of the rails 20. In an example, the adjustment with each adjustment bolt 24 is performed so that an upper surface of each rail 20 becomes horizontal.

As the slider 30, a known linear guide slider is usable. In the present embodiment, a plurality of metal balls are arranged in the slider, and the metal balls roll on each of the running grooves 21a of the rails 20.

As shown in FIG. 1, FIG. 2, and FIG. 4, each slider 30 includes an attachment plate 31 on an upper end side. A lower end of a small jack 40 is fixed to each attachment plate 31 by use of a bolt or the like. The jack 40 is a well-known jack such as a hydraulic jack. The jack 40 includes an operating lever 41, and the operating lever 41 is operated in the up-down direction to move a shaft 42 in an upper end portion of the jack 40 upward. Operation of another operating portion of the jack 40 or operation of the operating lever 41 in another direction moves the shaft 42 of the jack 40 downward.

On the other hand, as shown in FIG. 1 to FIG. 3, the maintenance apparatus of the present embodiment includes a robot side member 60 to be fixed to the arm part 2 of the robot R. In the present embodiment, a pair of robot side members 60 are fixed to opposite surfaces of the arm part 2 in the width direction of the robot R with the bolts B. In an example, each robot side member 60 is fixed to a side surface of the first arm member 11.

A plurality of screw holes 11a are formed in the side surface of the first arm member 11. The screw holes 11a are used to lift up the arm part 2 with the fork lift, the chain block or the like. At this time, an eye bolt, a pocket for the fork lift and the like are fixed to the first arm member 11 by use of the screw holes 11a. That is, the screw holes 11a are screw holes usually provided in the first arm member 11. Note that a plurality of robot side members 60 may be attached to opposite side surfaces of the arm part 2 in the width direction of the robot R.

Figure 5:
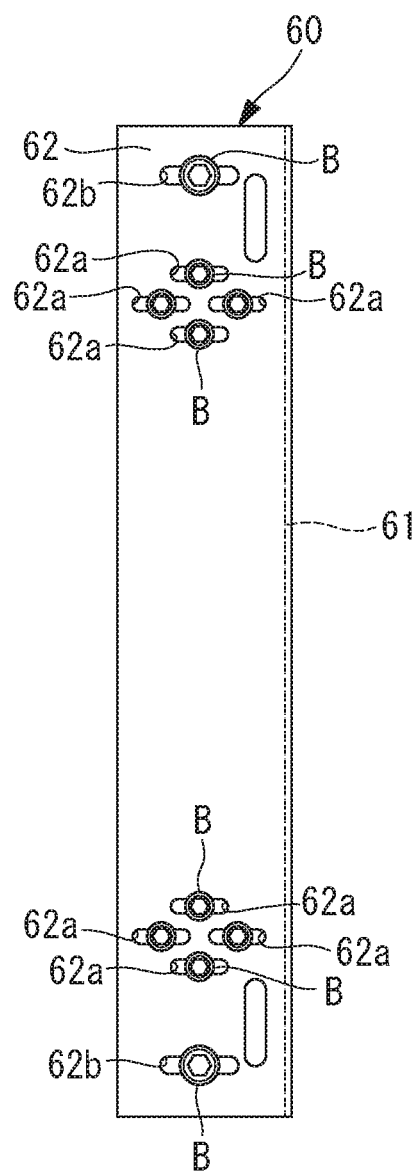
FIG. 5 is a plan view of a robot side member of the maintenance apparatus of the present embodiment.

Each robot side member 60 includes a fixed portion 61 to be fixed to the arm part 2 with a plurality of bolts B, and an extension 62 extending from an upper end of the fixed portion 61 to the robot R outward in the horizontal direction. In the extension 62, as shown in FIG. 5, a plurality of attachment holes 62a are formed to fix an upper end portion 43 of the shaft 42 of the jack 40 to the extension 62. Furthermore, in the extension 62, a plurality of pillar attachment holes 62b are formed to fix upper end portions of after-mentioned pillar members 50 to the extensions 62.

Each attachment hole 62a and each pillar attachment hole 62b are elongated holes that are elongated in the width direction of the robot R.

For example, female screw holes are provided in the upper end portion 43 of the shaft 42 of the jack 40. As shown in FIG. 1, FIG. 2, FIG. 5 and others, the plurality of bolts B inserted through the attachment holes 62a of the extension 62 are screwed into the female screw holes of the upper end portion 43, so that the upper end portion 43 of the shaft 42 of the jack 40 is fixed to the robot side member 60.

Each of the pillar members 50 is made of metal, reinforced plastic or the like, and is a rod-shaped member or a cylindrical member extending in the up-down direction as shown in FIG. 1 to FIG. 3. A female screw hole 50a extending in the up-down direction is formed at a lower end of the pillar member 50, and the female screw hole 50a can be in screwed engagement with a male screw portion 51c of a leg member 51. The leg member 51 includes a large diameter portion 51a on a lower end side, and a shaft portion 51b extending upward from the large diameter portion 51a. In the present embodiment, the male screw portion 51c is formed in an upper end portion of the shaft portion 51b. A lower surface of the large diameter portion 51a is in contact with an upper surface of a part of the slider 30 from above. A cover member 32 that covers the large diameter portion 51a from above is fixed to the upper surface of each slider 30. The cover member 32 is in contact with an upper surface of the large diameter portion 51a from above, and the leg member 51 is thereby attached to the slider 30, so that the leg member 51 is prevented from falling by the cover member 32. A female screw hole 50b extending in the up-down direction is also formed at an upper end of the pillar member 50. As shown in FIG. 1, FIG. 2, FIG. 3, FIG. 5 and others, the bolts B inserted through the pillar attachment holes 62b of the extensions 62 are screwed into the female screw holes 50b, so that the upper ends of the pillar members 50 are fixed to the robot side members 60.

As shown in FIG. 1 to FIG. 3, each slider 30 includes a brake 70. As the brake 70, it is possible to use a brake provided in a slider of a well-known linear guide. The brake 70 includes a lever 71, and a brake mechanism 72 that holds the running unit 21 in the width direction of the robot R depending on rotation of the lever 71.

A procedure will be briefly described in a case where the arm part 2 of the robot R is lifted up using the above maintenance apparatus. First, a worker fixes the pair of rails 20 to the base part 1 of the robot R as described above. Two sliders 30 are attached to each rail 20. On the other hand, the pair of robot side members 60 are fixed to the arm part 2 by use of the bolts B. Tilt of each rail 20 is adjusted with each adjustment bolt 24, and then the worker fixes the upper end portion 43 of each jack 40 to the robot side member 60 with the plurality of bolts B. At this time, the two sliders 30 of each rail 20 are arranged via a space from each other in the front-back direction of the robot R.

Note that preferably, as shown in FIG. 1 and FIG. 2, the worker fixes rear ends of the pair of rails 20 to each other with a rear-end side beam member 25, and fixes front ends of the pair of rails 20 to each other with a front-end side beam member 26. In consequence, the pair of rails 20 are reinforced, and an after-mentioned work is more safely performed.

Subsequently, the worker removes the bolts with which the first arm member 11 and the reducer 10 are fixed, and disconnects the first arm member 11 and the reducer 10. Subsequently, the worker operates the operating lever 41 of each jack 40 in the up-down direction to lift up the arm part 2. At this time, movement of each slider 30 is regulated by the brake 70. The arm part 2 is lifted up to a predetermined height, and then the worker attaches the lower ends of a plurality of pillar members 50 to the sliders 30. Specifically, the male screw portion 51c of the leg member 51 is screwed into the female screw hole 50a at the lower end of each pillar member 50, and the lower surface of the large diameter portion 51a is allowed to be in contact with the upper surface of a part of the slider 30 from above, and fixed from above with the cover member 32.

Subsequently, the worker adjusts a screw amount between the female screw hole 50a of the lower end of each pillar member 50 and the male screw portion 51c of the leg member 51. The screw amount is adjusted to adapt a height of each pillar member 50 to a lift amount of each jack 40. Furthermore, each pillar member 50 is configured to maintain a height of the robot side member 60 to the slider 30. Consequently, the female screw hole 50a at the lower end of each pillar member 50 also functions as an adjuster to adjust the height of the robot side member 60 to the slider 30.

Subsequently, the worker attaches the upper end of each pillar member 50 to the robot side member 60 as described above. Note that it is preferable that the above predetermined height be a height of several cm to several ten cm away from an upper end of the reducer 10 to a lower end of the arm part 2 in the up-down direction.

Subsequently, the worker moves four sliders 30 along the rails 20 while operating the brake 70, to move the arm part 2 in an extending direction of the rails 20 as shown in FIG. 2. Consequently, the work to the reducer 10 is facilitated.

Figure 6:
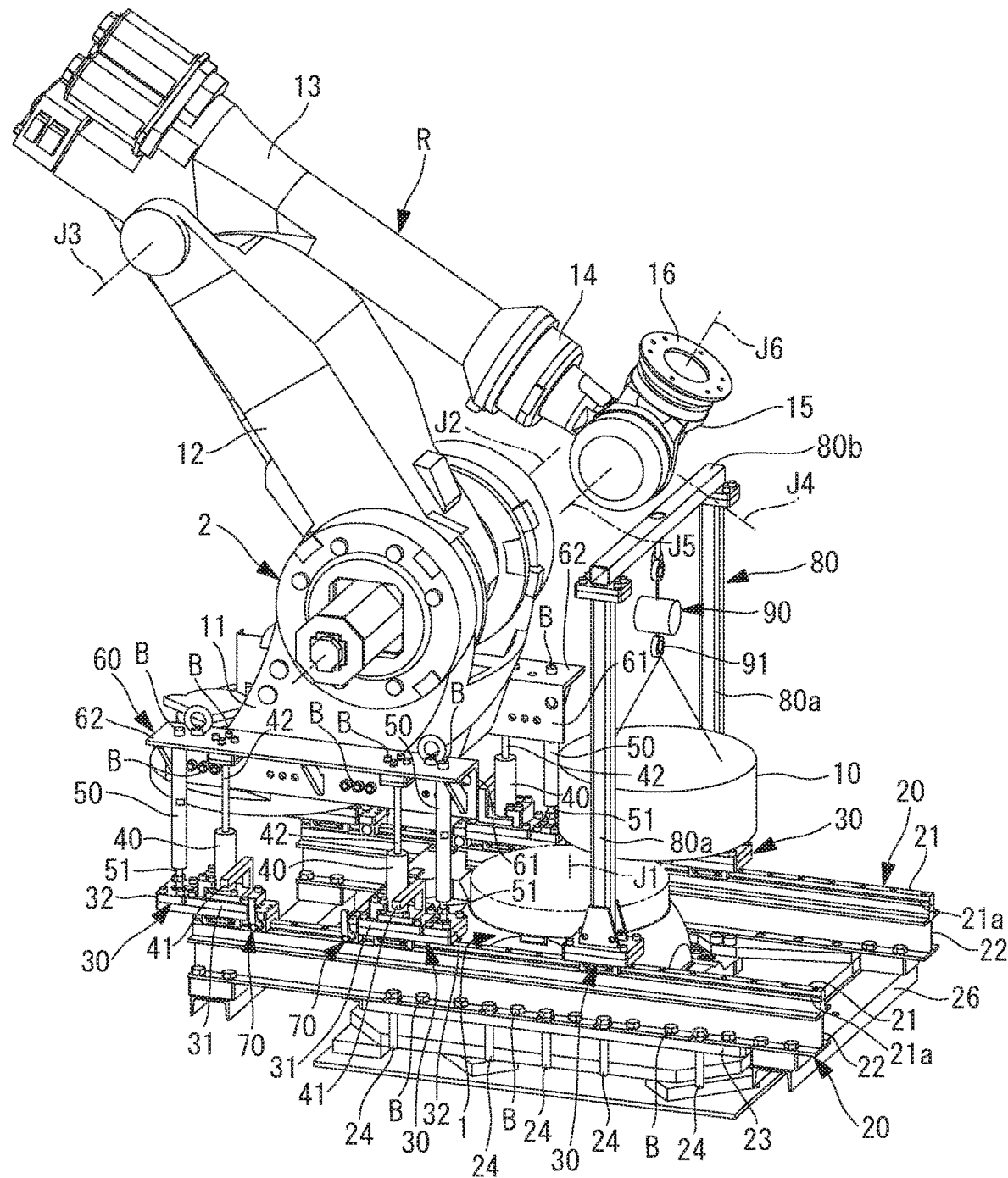
FIG. 6 is a perspective view of the maintenance apparatus of the present embodiment.

Note that as shown in FIG. 6, further sliders 30 may be provided on the pair of rails 20. In this case, a frame 80 is supported by the sliders 30, and a suspension mechanism 90 such as the chain block is suspended from an upper end portion of the frame 80. The suspension mechanism 90 includes a suspending chain 91, and the reducer 10 is suspended from a lower end of the chain 91.

The frame 80 is made of metal or the like, and includes a pair of up-down direction extensions 80a having lower ends fixed to a pair of sliders 30, respectively, and a beam 80b having opposite ends fixed to upper ends of the pair of up-down direction extensions 80a. The pair of sliders 30 may include the brake 70.

When the frame 80 is supported on the pair of sliders 30 and the suspension mechanism 90 is suspended from the upper end portion of the frame 80, the reducer 10 suspended by the suspension mechanism 90 can be moved along the rails 20. This configuration leads to facilitation of maintenance, replacement or the like of the reducer 10.

In the above embodiment, the rails 20 are attached on the opposite sides of the base part 1 of the robot R in the width direction. Consequently, a space between the pair of rails 20 can be decreased. Furthermore, positions of the rails 20 to the base part 1 are stabilized.

Furthermore, in the above embodiment, the pair of rails 20 include the sliders 30, respectively, the arm part 2 or the reducer 10 is supported by the sliders 30, and the arm part 2 or the reducer 10 moves along the rails 20 by the sliders 30. Consequently, a work space is a range along the rails 20 and becomes compact. Furthermore, since the positions of the rails 20 to the base part 1 are stabilized, efficiency and safety of the work improve.

Additionally, in the above embodiment, the pair of rails 20 are removably fixed to the base part 1 of the robot R. Consequently, even in a case where any space to install the rail 20 is not present in the installation surface around the robot R, the rail 20 can be stably fixed.

Furthermore, in the above embodiment, each rail 20 is fixed to the base part 1 via the rail fixing member 23. The female screw hole 23a is provided in a portion of the rail fixing member 23 on a side opposite to the base part 1, and the adjustment bolt 24 is screwed into the female screw hole 23a. Since the adjustment bolt 24 is in contact with the base part 1 or the installation surface, the tilt of the rail fixing member 23 and the rail 20 can be adjusted with the adjustment bolt 24. This configuration is useful in smoothly moving the slider 30 and safely performing the work.

Here, various types of robots R have different gravity center positions, respectively. Furthermore, the robot R can take various postures. In the above embodiment, a plurality of sliders 30 include the jacks 40, respectively. In this configuration, the lift amount of each of a plurality of jacks can be adjusted in accordance with the gravity center position, posture or the like of the arm part 2 to be lifted upward. The configuration is useful for facilitation of the work, and is also advantageous for the improvement of the safety of the work.

Furthermore, in the above embodiment, the robot side member 60 to be fixed to the arm part 2 is used, and the upper end portion 43 of each jack 40 is fixed to the robot side member 60. Consequently, the arm part 2 can be stably lifted by the jack 40 irrespective of the type of robot R.

Furthermore, the attachment holes 62a to attach the upper end portions 43 in the robot side member 60 are elongated holes that are elongated in the width direction of the pair of rails 20. Consequently, it is difficult to completely eliminate the tilt of each of the rails 20, but the upper end portions 43 of the jacks 40 can be easily and securely fixed to the robot side members 60 in an allowable range of the tilt of the rail 20.

Provided are the plurality of pillar members 50 attached to the plurality of sliders 30, respectively, after the arm part 2 is jacked up by the plurality of jacks 40. The lower end of each pillar member 50 is attached to the slider 30, and the upper end of each pillar member 50 is attached to the robot side member 60. Consequently, the arm part 2 is securely supported by each slider 30.

Note that in the above embodiment, the jack 40 and the pillar member 50 are arranged on each slider 30 in the extending direction of the rail 20. The configuration is advantageous in improving a resistance to a force to be applied to the arm part 2 in the extending direction of the rails 20.

Furthermore, each pillar member 50 includes the female screw hole 50a to change the height of the robot side member 60 to the slider 30. Various types of robots R have different gravity center positions, respectively. Additionally, the robot R can take various postures, and this configuration is advantageous in safely performing works adapted to various robots R.

Additionally, in the above embodiment, two sliders 30 are provided on each of the plurality of rails 20. Furthermore, in the above embodiment, the arm part 2 is jacked up in a state where two sliders 30 are apart from each other on each rail 20.

The space between the two sliders 30 can be suitably adjusted in accordance with a shape of the arm part 2, and hence, the configuration is advantageous in stabilizing the support of the arm part 2 and the movement of the arm part 2 along the rails 20.

Note that each of the jacks 40 does not necessarily have to be fixed to the slider 30. For example, a lower end portion of the jack 40 may be removably attached to the rail 20. For example, the plurality of jacks 40 are attached to the rails 20, and then the upper end portions 43 of the jacks 40 are attached to the robot side members 60, so that the arm part 2 can be lifted up with the plurality of jacks 40. Then, each of the lower ends of the plurality of pillar members 50 is fixed to the corresponding slider 30, and the upper ends of the plurality of pillar members are fixed to the robot side members 60. Thereafter, the jacks 40 can be removed from the robot side members 60 and the rails 20. In this case, the arm part 2 is supported on the sliders 30 by the plurality of pillar members 50, and the arm part 2 can move along the rails 20 in the same manner as described above.

Figure 7:
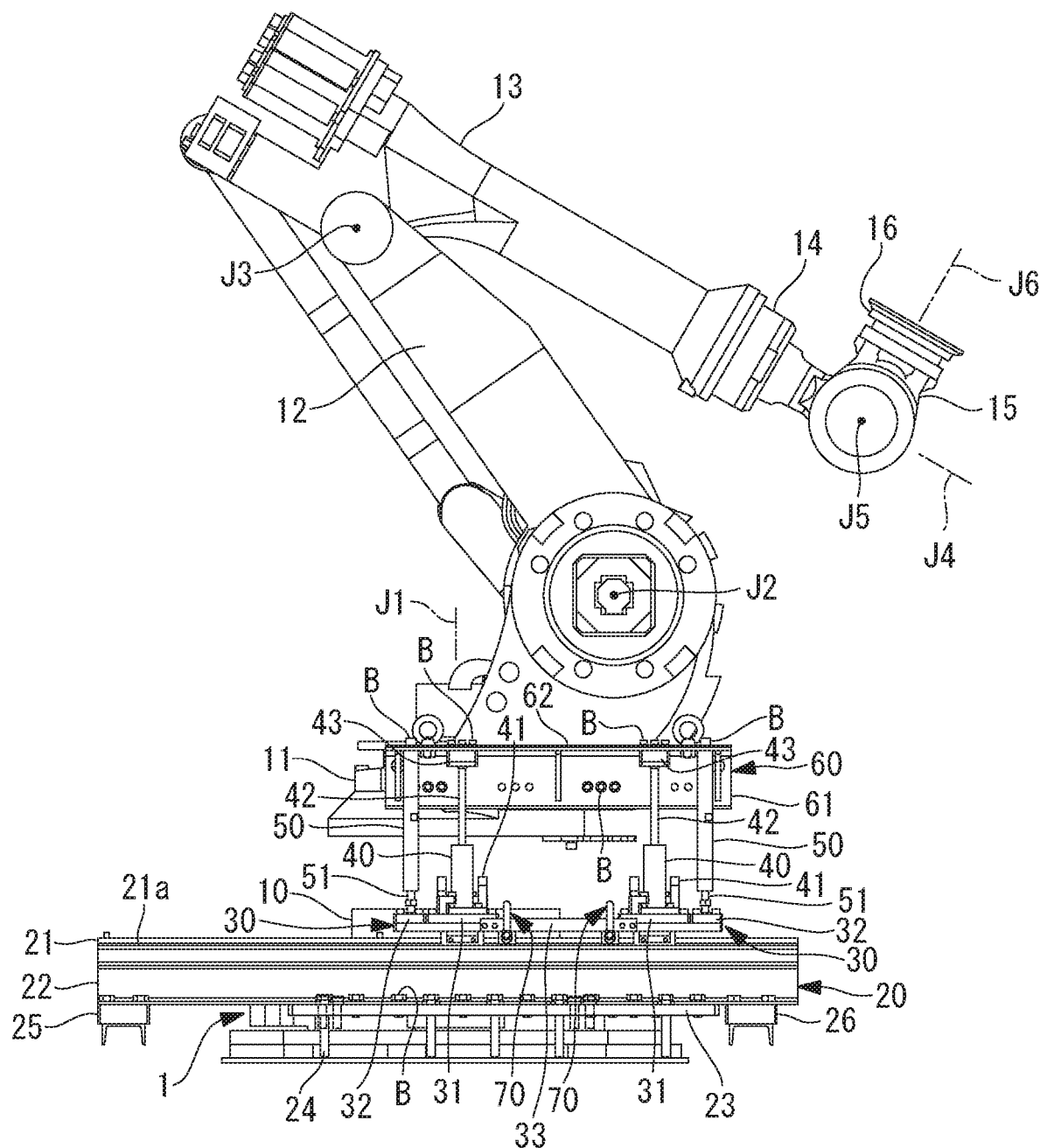
FIG. 7 is a side view of a maintenance apparatus showing a modification of the present embodiment.

Note that in the above embodiment, as shown in FIG. 7, a connection member 33 may be used to connect two sliders 30 of each rail 20 to each other. By use of the connection member 33, the arm part 2 is more stably supported by the sliders 30.

Furthermore, in the above embodiment, the pair of rails 20 may be arranged on opposite sides of the robot R in the front-back direction, or may be arranged on opposite sides of the robot R in another direction.

In the above embodiment, it is described that the upper end portions 43 of the jacks 40 and the upper ends of the pillar members 50 are attached to the robot side members 60. As another example, the upper end portions 43 of the jacks 40 may be fixed to the side surfaces of the first arm member 11 or the like by use of the screw holes 11a, and the upper ends of the pillar members 50 may be fixed to the side surfaces of the first arm member 11 or the like by use of the screw holes 11a.

In the above embodiment, the rails 20 are fixed to the base part 1. As another example, one or both of the pair of rails 20 may be installed on the installation surface of the base part 1. In this case, it is preferable that the front ends of the pair of rails 20 be fixed to each other by the front-end side beam member 26. Alternatively, the rear ends of the pair of rails 20 may be fixed to each other by the rear-end side beam member 25. Furthermore, when a part of each rail 20 installed on the installation surface is connected to the base part 1, the position of the rail 20 to the base part 1 is stabilized.

The invention claimed is:

1. A maintenance apparatus of a robot, comprising:
   a pair of parallel rails removably installed on opposite sides in a predetermined direction to the robot, and
   a plurality of sliders, wherein at least one slider is attached to each of the pair of rails,
   each of the sliders is configured to support an arm part or a reducer of the robot, and each of the sliders are configured to move the supported arm part or reducer along the rails,
   the pair of rails are removably attached to a base part of the robot,
   the maintenance apparatus of the robot further comprises a pair of rail fixing members to which lower end portions of the pair of rails are fixed,
   each of the rails is fixed to the base part via the rail fixing member,
   a female screw hole extending through each of the rail fixing members in an up-down direction is provided in a portion of each of the rail fixing members on a side opposite to the base part, and an adjustment member is screwed into the female screw hole, and a lower end of the adjustment member is in contact with the base part or an installation surface on which the base part is installed.

2. A maintenance apparatus of a robot, comprising:

a pair of parallel rails removably installed on opposite sides in a predetermined direction to the robot, and a plurality of sliders, wherein at least one of the plurality of sliders is attached to each of the pair of rails, each of the sliders is configured to support an arm part or a reducer of the robot, and each of the sliders are configured to move the supported arm part or reducer along the rails, the maintenance apparatus of the robot further comprises:

a plurality of jacks supported by the plurality of sliders, respectively, wherein the plurality of jacks jack up the arm part or the reducer; and a robot side member fixed to the arm part of the robot, a lower end of each of the jacks is supported by the slider, and an upper end of each of the jacks is fixed to the robot side member, an attachment hole to fix the upper end of the jack is provided in the robot side member, and the attachment hole is an elongated hole that is elongated in the predetermined direction.

3. A maintenance apparatus of a robot, comprising:

a pair of parallel rails removably installed on opposite sides in a predetermined direction to the robot, and a plurality of sliders, wherein at least one of the plurality of sliders is attached to each of the pair of rails, each of the sliders is configured to support an arm part or a reducer of the robot, and each of the sliders are configured to move the supported arm part or reducer along the rails, the maintenance apparatus of the robot further comprises:

a plurality of jacks supported by the plurality of sliders, respectively, wherein the plurality of jacks jack up the arm part or the reducer; and a robot side member fixed to the arm part of the robot, a lower end of each of the jacks is supported by the slider, and an upper end of each of the jacks is fixed to the robot side member, the maintenance apparatus of the robot further comprises:

a plurality of pillar members attached to the plurality of sliders, respectively, after the arm part is jacked up by the plurality of jacks, and a lower end of each of the pillar members is attached to the slider, and an upper end of each of the pillar members is attached to the robot side member.

4. The maintenance apparatus of the robot according to claim 3, wherein each of the pillar members includes an adjuster to change a height of the robot side member to the slider.

5. The maintenance apparatus of the robot according to claim 1, wherein each of the plurality of rails comprises two sliders.

6. The maintenance apparatus of the robot according to claim 2, wherein each of the plurality of rails comprises two sliders, and the arm part is jacked up by the plurality of jacks in a state where the two sliders attached to one rail of the pair of rails are away from each other in a longitudinal direction of the rail.

7. The maintenance apparatus of the robot according to claim 1, further comprising:

a brake that is provided in each of the plurality of sliders and that regulates movement of the slider to the rail.

8. The maintenance apparatus of the robot according to claim 1, further comprising:

a frame supported by a pair of the plurality of sliders that are attached to each of the pair of rails, and a suspension mechanism suspended from an upper end portion of the frame, wherein the suspension mechanism is configured to suspend the reducer.

* * * * *